United States Patent Office 3,796,610
Patented Mar. 12, 1974

3,796,610
GLYCEROL SOLDERING FLUXES
Frank H. Sarnacki, Johnson City, and Robert V. Steenstrup, Binghamton, N.Y., assignors to International Business Machines Corporation, Armonk, N.Y.
No Drawing. Filed Sept. 28, 1972, Ser. No. 293,199
Int. Cl. B23k 35/36
U.S. Cl. 148—25        7 Claims

ABSTRACT OF THE DISCLOSURE

A water soluble fluxing bath composition having particular value in immersion soldering of metallic surfaces and electrical connections and that is characterized by good thermal and chemical stability and easy removal of flux residues without corrosion or insulation resistance hazards, comprising from about 0.2 to 0.5% by weight of hydrochloric acid, from about 2.0 to 4.0% by weight of tartaric acid, from about 80 to 98% by weight of glycerin solvent. An alkyl alcohol diluent for the acid additions may be added in an amount of from 0 to 15% by weight. Isopropyl alcohol is preferred.

BACKGROUND OF THE INVENTION

Field of the invention

This invention relates to glycerol soldering fluxes and more particularly to flux bath compositions containing 1,2,3-propanetriol, a glycerol compound as name approved by International Union of Chemists (IUC).

Description of the prior art

In soldering electrical connections or surface soldering printed circuits, it is usually necessary to employ fluxes to wet, remove tarnish and activate the metallic surfaces being soldered. In addition, the flux must protect the activated surfaces against any passive film formation during alloying of the solder to metal circuits or surfaces being joined. To be effective, the flux bath has to be useful and operative at the soldering temperature employed. Furthermore, both the flux and flux residues have to be easily removable and/or non-corrosive to the metal contacts being soldered.

Prior art fluxes used in immersion bath soldering had the disadvantage of a narrow useful temperature range, a limited temperature life in high preheat exposure, a residue that was difficult to remove because of innate polymerization and retained flux activators becoming ionized by water leaching to promote local corrosion or low insulation resistance hazards. In addition, those prior art flux residues that required organic solvent cleaning to remove them exposed organic encapsulating and laminate materials to a potential solvent degradation action involving swelling or partial dissolution thereof.

SUMMARY OF THE INVENTION

These disadvantages of prior art have now been overcome by the use of glycerin as solvent, since it possesses thermal and chemical properties especially useful with an activating agent, such as hydrochloric acid. In addition, the higher flashpoint and boiling point of these glycerol solvents as compared with those used in prior art minimizes the ignition hazard and premature evaporation of such fluxes, even under prolonged exposure conditions on an assembly line. The ability to wet land, plated-through-hole and lead surfaces of boards and components with a low melting solder (M.P. 65.6°–148.9° C.) while immersed in this water soluble fluxing bath provides for a relatively low temperature (93.3°–176.7° C.) solder process joining and a broader range for sequential solder packaging. Such processing eliminates or minimizes packaging stability and reliability problems associated with large thermal gradients, surface oxidation and improper post solder cleaning. The corrosion problems of prior art are also solved by these glycerol compositions, inasmuch as the residue of these substances, after a soldering operation, may be easily washed away by the use of water. The entrapment of undesirable contaminants is thereby largely eliminated. Even if some residue were to remain, however, it would be of a non-corrosive kind and in non-corrosive quantities.

A further important factor in the use of these solvents is that operating personnel would be unaffected when skin or clothing were to come into contact with these glycerol solvents, since said solvents are frequently used in cosmetic formulations, such as face and hand emulsions and thus are completely nontoxic.

It is, therefore, an object of this invention to produce a glycerol soldering flux useful in immersion soldering operations involving metallic surfaces and electrical connections, and especially adapted for microelectronic packaging.

It is another object of the invention to provide a water soluble flux composition particularly adaptable as an immersion bath to perform preheating and soldering functions.

It is a further object of this invention to employ a composition comprising one or more activating agents, a solvent or carrier and a wetting agent, if desired, in order to produce the superior compositions of this invention.

Other objects and advantages will be more apparent and the invention will be more readily understood from the following description.

DESCRIPTION OF THE PREFERRED EMBODIMENTS

Briefly, this invention relates to glycerol soldering fluxes and particularly to flux bath compositions containing 1,2,3-propanetriol in combination with one or more activators including a mineral acid such as hydrochloric acid and a polycarboxylic acid such as tartaric acid. The glycerol serves both as a carrier and a wetting agent giving improved thermal and chemical stability to the immersion bath as compared to other solvents used heretofore. The hydrochloric acid activates the metallic surfaces adequately without overetching to promote alloying of the solder to these contact surfaces. The tartaric acid aids in metal surface activation and has the additional capacity of promoting the formation of water soluble metal-complex compounds. The composition is thermally stable over a wider temperature range than is available with oil base fluxes in prior art. Although there is a gradual loss of some of the activator through evaporation, the bath can be fully restored to the desired activation level by periodic acid additions.

By immersing a printed circuit substrate in these glycerol-activator formulations heated to 10° C.–37.8° C. above the solder melting point, the substrate can be preheated uniformly in a non-oxidizing environment and the solder made to (1) wet and reflow into electroplated or electroless plated surfaces, (2) seal plated-through-holes, or (3) reflow join pinned or leaded components to the substrate.

The successful use of the glycerol base-flux compositions with both low and intermediate melting point (65.6°–148.9° C. and 148.9° C.—204.4° C. respectively) solder alloys provides a broader temperature range for sequential solder packaging (93.3°–232.2° C.). The applicability of the baths to low melt alloys is of particular importance at the board level because it allows for assembly, disassembly and rework at markedly lower processing temperatures. The corresponding reduction in ΔT (the temperature difference between the environment and the bath, ° C.) results in a notable reduction in substrate thermal gradients and the differential thermal expansion stresses resulting therefrom. Consequently, this minimization of thermal stress affects an increase in both the stability and reliability of the substrate and the solder joints.

As the bath compositions are water soluble, both the flux and flux residues may be easily washed from the substrate or package surfaces by water. The entrapment of undesirable contaminants is thereby largely eliminated. Even if some residue were to remain, however, it would be of a non-corrosive kind and in non-corrosive quantities.

The broad requirements of an activating agent, solvent and wetting agent, if desired, can be satisfied by the following two compositions:

0.2–0.5% by weight of hydrochloric acid;
2.0–4.0% by weight of tartaric acid;
80–98% by weight of glycerol such as 1,2,3-propanetriol with;
0–15% by weight of alkyl alcohol; with the balance, if if any, of water.

The second composition contemplated contains:

0.2–0.5% by weight of hydrochloric acid;
80–98% by weight of glycerol such as 1,2,3-propanetriol with;
0.15% by weight of alkyl alcohol; with the balance, if any, of water.

In the first composition, 1,2,3-propanetriol along with isopropyl alcohol as a diluent are used as solvents. The glycerol serves both as a carrier and a wetting agent giving improved thermal and chemical stability to the immersion bath as opposed to other solvents used heretofore. The hydrochloric acid activates the metallic surfaces adequately without overetching to promote alloying of the solder to these contact surfaces. The tartaric acid aids in metal surface activation and has the additional capacity of promoting the formation of water soluble metal-complex compounds. The composition is ideally suited to meet the temperature requirements (93.3°–232.2° C.) in immersion soldering of either low or intermediate melting solders and to produce sound joints and alloyed surfaces. Among its advantages are a low evaporation rate and optimum solder filleting. Although there is gradual loss of the activator through evaporation, the bath can be fully restored to the desired activation level by periodic acid additions. Finally, but very important, the residue of flux remaining after a soldering operation is water washable and removable.

In order to provide a better understanding of the details of this invention, the following examples of composition are illustrative of the invention. These examples, however, are by no means limitative and are merely presented here for help in describing the particular compositions involved.

EXAMPLE 1

| | Grams |
|---|---|
| Hydrochloric acid | 3 |
| 1,2,3-propanetriol | 967 |
| Isopropyl alcohol | 90 |
| Tartaric acid | 30 |

EXAMPLE 2

| | Grams |
|---|---|
| Hydrochloric acid | 5 |
| 1,2,3-propanetriol | 995 |
| Isopropyl alcohol | 15 |

Note in the above examples the glycerol addition may be mixtures with other molecular weight glycerols.

While the invention has been particularly shown and described with reference to preferred embodiments thereof, it will be understood by those skilled in the art that the foregoing and other changes in form and details may be made therein without departing from the spirit and scope of the invention.

We claim:
1. A fluxing composition comprising:
   from about 0.2% to 0.5% by weight of hydrochloric acid,
   from about 2.0% to 4.0% by weight of tartaric acid,
   from about 80% to 98% by weight of glycerol, and the balance water.
2. The composition of claim 1 further comprising from about 1% to 15% by weight of alkyl alcohol.
3. The composition of claim 1 wherein the glycerol is 1,2,3-propanetriol.
4. A fluxing composition comprising:
   from about 2 to 10 grams of hydrochloric acid,
   from about 950 to 1000 grams of glycerol,
   from about 50 to 125 grams of isopropyl alcohol, and
   from about 20 to 40 grams of tartaric acid.
5. The composition of claim 4 wherein the glycerol is 1,2,3-propanetriol.
6. A fluxing composition comprising:
   from about 3 to 10 grams of hydrochloric acid,
   from about 975 to 1025 grams of glycerol, and
   from about 10 to 20 grams of isopropyl alcohol.
7. The composition of claim 6 wherein the glycerol is 1,2,3-propanetriol.

References Cited
UNITED STATES PATENTS

| 3,003,901 | 10/1961 | Marcell | 148—23 |
| 3,746,620 | 7/1973 | Vance | 148—23 |
| 3,734,791 | 5/1973 | Poliak | 148—25 X |
| 2,155,307 | 4/1939 | Hagemann | 148—25 |
| 2,548,690 | 4/1951 | Vieno | 148—23 X |
| 3,309,239 | 3/1967 | Harris | 148—23 X |
| 2,788,303 | 4/1957 | Ballard et al. | 148—23 |
| 2,473,580 | 6/1949 | Eubank et al. | 148—23 |
| 2,626,881 | 1/1953 | Schoenfeld | 148—23 |
| 1,775,197 | 9/1930 | Habif | 148—23 |

ALLEN B. CURTIS, Primary Examiner
T. A. WALTZ, Assistant Examiner

U.S. Cl. X.R.
75—94; 148—23